(No Model.)
G. C. FOOSE.
DUST PAN.
No. 469,781. Patented Mar. 1, 1892.
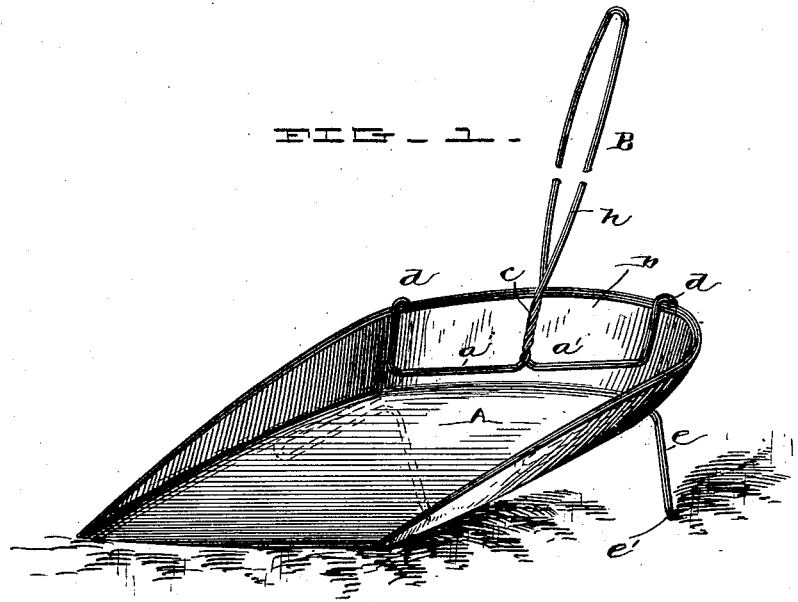
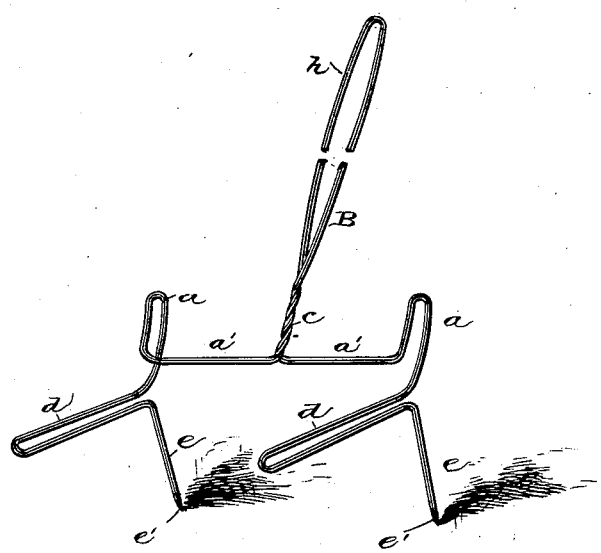
Witnesses
H. D. Nealy
C. B. Griffith
Inventor
Geo. C. Foose
By his Attorney
J. R. Drake.

United States Patent Office.

GEORGE C. FOOSE, OF WARSAW, NEW YORK, ASSIGNOR OF ONE-HALF TO ROBERT HORNE, OF SAME PLACE.

DUST-PAN.

SPECIFICATION forming part of Letters Patent No. 469,781, dated March 1, 1892.

Application filed November 5, 1891. Serial No. 410,920. (No model.)

*To all whom it may concern:*

Be it known that I, GEORGE C. FOOSE, a citizen of the United States, residing at Warsaw, in the county of Wyoming and State of New York, have invented certain new and useful Improvements in Dust-Pans; and I do hereby declare the following to be a full, clear, and exact description of the invention, such as will enable others skilled in the art to which it appertains to make and use the same.

This invention relates to dust-pan holders having long handles thereto to prevent kneeling and stooping in using; and the invention consists in a combined holder and handle made of a single wire or thin metal bent in such a manner as to confine the dust-pan, form the legs, and end in a long upright handle, all as fully hereinafter described and claimed.

The invention will be understood by reference to the following specification and drawings, in which—

Figure 1 is a perspective of the combined holder, handle, and legs with a dust-pan in connection therewith; Fig. 2, a perspective of same without the dust-pan.

A represents the common tin dust-pan; B, the handle, holder, and legs in one, made of a single piece of wire of sufficient thickness or of thin metal bent in two loops $a\,a$, so as to receive the upright rear end $b$ of the dust-pan, then continued inside the rear end of the pan at $a'\,a'$, longitudinally meeting in the center and uniting at $c$, and then twisted together and run upward with a backward slant to form the long handle $h$, so as to allow the user to stand upright in gathering up the dust, sweepings, &c. The loops $a\,a$ are continued down the back of the pan. Then the wire is passed under the pan, making rests $d\,d$ for the rear of the bottom of the pan to set on. Then the wire is bent sharply backward to the end of the pan and bent down at right angles a sufficient distance to form the feet $e\,e$, so as to keep the pan tilted downward at the front end. The feet are made sharp-pointed, as at $e'\,e'$, to prevent slipping on smooth floors.

The loops $a\,a$, comprising the back, the inside part $a'\,a'$, and the under rests $d\,d$, combined with the handle, make a spring-receiver, holding the pan firmly in position, the under parts $d\,d$ aiding this and acting also as a rest for the pan and the legs raising the rear end from the floor.

The pan is easily removed by merely unspringing it, and the handle is hung up by the loops formed by the twisted end. For simplicity and effectiveness it is all that can be desired.

I claim—

The combined handle and dust-pan holder B, consisting of the single wire formed into the loops $a\,a$, longitudinal parts $a'\,a'$, united at $c$ and twisted together and continued upward, forming the handle $h$, and the under rests $d\,d$, their ends continued downward and adapted to form the legs $e\,e$, having sharp-pointed ends $e'\,e'$, all substantially as specified.

In testimony whereof I affix my signature in presence of two witnesses.

GEORGE C. FOOSE.

Witnesses:
J. R. DRAKE,
JOHN F. BURKE.